Patented June 1, 1943

2,320,970

UNITED STATES PATENT OFFICE 2,320,970

SOLVENT EXTRACTION OF TUNG OIL

Arthur C. Lansing, Terre Haute, Ind., assignor to Commercial Solvents Corporation, Terre Haute, Ind., a corporation of Maryland No Drawing. Application March 10, 1941,
Serial No. 382,576

5 Claims. (Cl. 260—412.4)

My invention relates to the recovery of tung oil from tung nuts, and more particularly to a solvent extraction process for this purpose, which is especially suited for the extraction of fresh tung nuts.

Up to the present time, tung oil has been obtained only by expressing the oil from the nut meats. This process, however, has had numerous disadvantages. A certain amount of the tung oil is necessarily left in the oil cake, and the heat generated in the oil expeller, together with the access of air in the process, result in polymerization and oxidation of the expressed oil. The oil cake from this process is highly colored, and has practically no commercial value. In view of these defects of the process, there has been a demand for an improved process for extracting the oil from the tung nuts. Solvent extraction processes, however, have met with even worse difficulties. Many organic solvents, for example, serve to extract the oil from the nut meats, but on volatilization of the solvent, the oil is left in a solid polymerized mass. Other solvents give yields of oil less than are obtainable from the expelling process, and still other solvents require drying of the nut meats for satisfactory operation, with resulting loss of oil by oxidation during the drying process. The situation with respect to solvent extraction has been recently summarized by Dr. Henry G. Knight of the U. S. Department of Agriculture: "Owing to the unique character of tung oil, the usual solvent extraction methods are not applicable to the recovery of oil from the tung seeds." (Oil, Paint, and Drug Reporter, April 15, 1940.)

I have now found that whereas practically all of the common volatile organic solvents give rise to the difficulties discussed above, mixtures consisting of the lower aliphatic ketones with the lower aliphatic alcohols are unique in their freedom from these defects. Such mixtures may be employed to extract the fresh undried tung nuts, to give high yields of light-colored, fluid tung oil having practically none of the undesirable characteristics of expressed oil. A further advantage of my process is the fact that instead of a dark, scorched oil cake, a very light colored residue is obtained, which is suited for use in the plastics industry, and for other uses in the arts. While my process is especially adapted for the extraction of fresh undried tung nuts, it may also be successfully used for the extraction of nuts which have been stored, and which have become dried and somewhat oxidized. However, an advantageous feature of my invention is the minimizing of oxidation and polymerization, with resulting improved yields of oil. To take full advantage of this feature of my invention, it is therefore desirable to use fresh undried tung nuts, and to effect the extraction as soon as possible after removal of the nut meats from the shells.

Any of the lower aliphatic ketones may be employed in my process. Acetone is especially suited for this purpose, and the effectiveness of the other ketones decreases with increasing molecular weight. Partial water miscibility is desirable for the extraction of undried tung nuts, and ease of volatility is desirable from the standpoint of solvent recovery from the extracted oil, and from the oil cake. For these reasons, I generally prefer to employ ketones having from 3 to 6 carbon atoms, and, as stated above, acetone is the most desirable of these.

The use of such solvent mixtures is particularly advantageous since said mixtures render possible the procurement of higher yields of oil and produce an oil which is of lighter color, and of greater stability on storage. Any of the lower aliphatic alcohols may be employed for this purpose, but the same considerations apply here as in the case of the ketones discussed above. For these reasons methanol is the most desirable of the alcohols. Ketone-alcohol mixtures of various proportions may be used, but I prefer to use a mixture containing a major proportion of ketone and a minor proportion of alcohol. The azeotropic mixtures of minimum boiling points are desirable from the standpoint of minimizing the exposure of the oil to high temperatures during solvent recovery. The azeotropic mixture of acetone and methanol is a particularly satisfactory solvent for my process.

The preparation of the nut meats, for extraction, may follow standard practices in preparing the meats for the oil-expeller process. The hulling, decorticating, and separating operations may be effected in the known manner, using standard apparatus. The nut meats can be extracted without further treatment, but a crushing operation will result in easier access of the solvent to the oil cells, with resulting improved rate of extraction. The nut meats can suitably be flaked on a flaking roll mill of the type used in the soy bean extraction industry. This treatment decreases the depth of penetration required in the extraction, and is more desirable than other types of crushing operations, or grinding or chopping procedures, since it does not expose new surfaces to oxidation. However, any standard method of crushing, grinding, or chopping can be used, particularly if precautions are taken to minimize oxidizing effects. Protection by non-oxidizing atmospheres, or effecting the crushing or comminuting in the extracting solvent, will serve to prevent substantial oxidation at this stage of the process.

For the production of a light-colored oil, the nut meats should be substantially free from hulls and shells. In all cases it is preferable to use nut meats which are free from hulls, but the shells can be present if the resulting darker color of the oil is not objectionable. Oil extracted from a mixture of nut meats and shells is somewhat more stable than the lighter colored oil extracted from the meats alone, and tends to acidify to a lesser degree on prolonged storage.

After crushing, the prepared meats are subjected to the action of the solvent, in accordance with known practices for extraction of solids by volatile solvents. Standard methods, such as batch extraction, countercurrent batch extraction, or countercurrent continuous extraction, may be used. The usual types of extraction apparatus may be employed, and a closed system should be used to prevent solvent losses, and to minimize access of air and its resulting oxidation effects on the oil.

At the conclusion of the extraction, the solvent may be separated from the oil by distillation. Extracts prepared with low boiling solvents, such as acetone-methanol mixtures, may be distilled at atmospheric pressure until an increased temperature is required for the final stripping. At this point it is very desirable to employ vacuum distillation for the removal of the residual solvent, in order to minimize heat polymerization effects. For the same reason, vacuum distillation should be used throughout in separating higher boiling solvents.

At each stage of the procedure described above, I prefer to control the amount of contact of oxygen with the tung oil to prevent substantial oxidation of the oil, and to control the temperature to prevent substantial polymerization of the oil. For this purpose it is not necessary to use the extreme precautions of excluding all contact of the oil or oil-bearing materials with air, or of maintaining atmospheric temperature throughout the process. The air contact normally entailed in the above processing operations, using closed equipment, and taking precautions to prevent unnecessary entrainment of air in the liquids, or prolonged contact of air with the nut meats, will not be sufficient to cause substantial oxidation of the oil. Temperatures considerably above atmospheric temperature may be used if the time of heating is not too prolonged. Elevated temperatures increase the rate of oil extraction, but at high temperatures the increase in rate of polymerization will exceed the increase in rate of extraction. I prefer, therefore, to maintain the temperature at not substantially above 50° C. where long heating periods are involved. Even for short heating periods I prefer to maintain the temperature at not substantially above 100° C. For this reason the final stripping of the solvent from the extract is preferably effected at reduced pressure.

The crude oil obtained from fresh nut meats in the manner described above is a light-colored, very fluid oil which is superior in many respects to expressed oil, and which is suitable for most uses in the arts without further refining. However, in certain cases, especially when using solvents of high water miscibility for the extraction of fresh, undried tung nuts, a minor proportion of water soluble solids may be extracted simultaneously with the oil. Oils containing such solids may be refined by washing with water and drying, or by other treatments such as dissolving in benzene or other water-immiscible solvent, filtering, and separating the solvent by distillation. When the extraction is effected by my preferred procedure, in which the action of atmospheric oxygen and the action of superatmospheric temperature on the nut meats and extracted oil are minimized, the resulting oil is substantially free from oxidized or highly polymerized components. Such oil may be stored for long periods of time without deterioration, if protected from oxygen, heat, and light. Partial solidification of the oil on prolonged storage may be encountered, but the solidification is not permanent or irreversible. The solidified portion of such stored oil may be reliquefied by mild heating.

My invention may be further illustrated by the following specific example:

*Example I*

Tung nuts from a new crop were hulled, shelled, and the nut meats immediately crushed and subjected to extraction by percolation, with the azeotropic mixture of acetone and methanol. The extraction was carried out for a period of 24 hours at room temperature. Ratio of total solvent to nut meats was approximately 10 gallons of the acetone-methanol mixture per pound of nut meats. The extract was distilled to remove the bulk of the solvent, and the remainder was removed by stripping at 100° C., under 25 inches vacuum. The yield of tung oil thus obtained was 60.3%, based on the weight of the undried nut meats. The oil was dissolved in benzine, the solution was filtered, and the extract was then stripped of benzine to recover the refined oil. The refined oil was obtained in a yield of 55.5%, and was free from water and water-soluble solids. The refined product was a clear, bright fluid oil which was lighter in color than the oils obtained in the preceding example. The superior color of this oil was retained through 9 months' storage. In this length of time only a slight amount of solidification was encountered, the solidified portion of the oil being much less than that found in the stored samples of oils in the preceding example. The solidified oil was easily reliquefied on heating. As in the case of the preceding example, the extracted residue, obtained in this case, had a light cream color.

It is to be understood, of course, that the above example is merely illustrative, and does not limit the scope of my invention. Other ketone-alcohol mixtures may be employed, and other components may be incorporated in the extraction solvent in conjunction with the ketone-alcohol mixture, as long as a ketone constitutes a major solvent component. Likewise, the procedural steps of the above example may be modified in numerous respects in accordance with the preceding description. In general, it may be said that the use of any equivalents or modifications of procedure, which would occur to those skilled in the art, is included in the scope of my invention.

My invention now having been described, what I claim is:

1. A process for obtaining tung oil from tung nuts, which comprises extracting tung nut meats with a volatile organic solvent containing a major proportion of a lower aliphatic ketone, and a minor proportion of a lower aliphatic alcohol, and separating the solvent from the resulting extract by distillation, at least the final portion of said distillation being effected under vacuum.

2. A process for obtaining tung oil from tung nuts, which comprises extracting tung nut meats with a volatile organic solvent containing a major proportion of an aliphatic ketone of 3 to 6 carbon atoms, and a minor proportion of an aliphatic alcohol of 1 to 3 carbon atoms, and separating the solvent from the resulting extract by distillation, at least the final portion of said distillation being effected under vacuum.

3. A process for obtaining tung oil from tung nuts, which comprises extracting tung nut meats with a volatile organic solvent comprising essentially acetone and methanol in azeotropic proportions, and separating the solvent from the resulting extract by distillation, at least the final portion of the distillation being effected under vacuum.

4. A process for obtaining tung oil from tung nuts, which comprises separating the nut meats from the hulls and shells, crushing said nut meats, extracting the crushed meats with a volatile organic solvent containing a major proportion of a lower aliphatic ketone and a minor proportion of a lower aliphatic alcohol, separating the solvent from the resulting extract by distillation, controlling the amount of contact of oxygen with the tung oil throughout the process to prevent substantial oxidation of said oil, and controlling the temperature throughout the process to prevent substantial polymerization of said oil.

5. A process for obtaining tung oil from tung meats, which comprises separating the nut meats from the hulls and shells, crushing said nut meats, extracting the crushed meats with a volatile organic solvent comprising essentially acetone and methanol in azeotropic proportions, maintaining the temperature throughout said operations at not substantially above 50° C., separating the bulk of the solvent from the resulting extract by distillation, stripping the residual solvent from the oil by vacuum distillation, at a temperature not substantially above 100° C., and controlling the amount of contact of oxygen with the tung oil throughout the process to prevent substantial oxidation of said oil.

ARTHUR C. LANSING.